United States Patent [19]

Schliesing et al.

[11] Patent Number: 4,860,975

[45] Date of Patent: Aug. 29, 1989

[54] SMART TUNNEL - DOCKING MECHANISM

[75] Inventors: John A. Schliesing, Houston; Kevin L. Edenborough, Lubbock, both of Tex.

[73] Assignee: The United States of America as represented by the Administrator of the National Aeronautics and Space Administration, Washington, D.C.

[21] Appl. No.: 292,131

[22] Filed: Dec. 30, 1988

[51] Int. Cl.⁴ .............................................. B64G 1/64
[52] U.S. Cl. .................................. 244/161; 405/188; 14/71.5; 244/137.2
[58] Field of Search .................... 244/158 R, 159, 160, 244/161, 162, 137.2; 14/71.5; 405/188, 189, 192; 166/340-343, 349, 338

[56] References Cited

U.S. PATENT DOCUMENTS

| | | | |
|---|---|---|---|
| 1,785,528 | 12/1930 | Rourke | 405/189 |
| 2,942,816 | 6/1960 | Dostie | 244/137.2 |
| 3,047,891 | 8/1962 | Golde et al. | 14/71.5 |
| 3,364,836 | 1/1968 | Boylan et al. | 405/192 |
| 3,391,881 | 7/1968 | Maltby | 244/1 |
| 3,608,848 | 9/1971 | Cantor et al. | 244/1 |
| 3,737,117 | 6/1973 | Belew | 244/1 SD |
| 3,753,536 | 8/1973 | White | 244/1 SD |
| 3,820,741 | 6/1974 | Ratcliff | 244/1 SD |
| 3,952,976 | 4/1976 | Fletcher et al. | 244/158 |
| 4,219,171 | 8/1980 | Rudmann | 244/161 |
| 4,333,195 | 6/1982 | Lichti | 14/765 |
| 4,682,745 | 7/1987 | Acres | 244/161 |

Primary Examiner—Galen L. Barefoot
Attorney, Agent, or Firm—Russell E. Schlorff; John R. Manning; Edward K. Fein

[57] ABSTRACT

A docking mechanism for the docking of a space vehicle 11 to a space station 12 comprising a flexible tunnel frame structure which is deployable from the space station. The tunnel structure comprises a plurality of series connected frame sections 21, one end section of which is attached to the space station and the other end attached to a docking module 15 of a configuration adapted for docking in the payload bay of the space vehicle 11. The docking module is provided with trunnions 41, 42 adapted for latching engagement with latches 17 installed in the vehicle payload bay and with hatch means 44 connectable to a hatch of the crew cabin of the space vehicle. Each frame section 21 comprises a pair of spaced ring members 31a, 31b interconnected by actuator-attenuator devices 33 which are individually controllable by an automatic control means to impart relative movement of one ring member to the other in six degrees of freedom of motion. The control means includes computer logic responsive to sensor signals of range and attitude information, capture latch condition, structural loads, and actuator stroke for generating commands to the on-board flight control system and the individual actuator-attenuators to deploy the tunnel to effect a coupling with the space vehicle or to adjust the relative attitude of the space vehicle and space station after coupling. A tubular fluid-impervious liner, preferably fabric 51, is disposed through the frame sections 21 of a size sufficient to accommodate the passage of personnel and cargo.

8 Claims, 4 Drawing Sheets

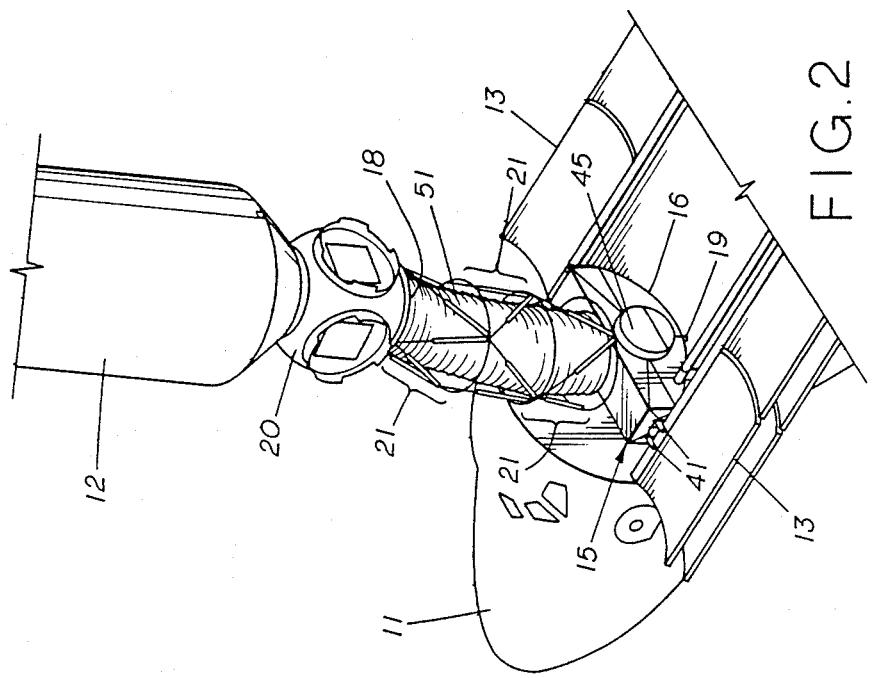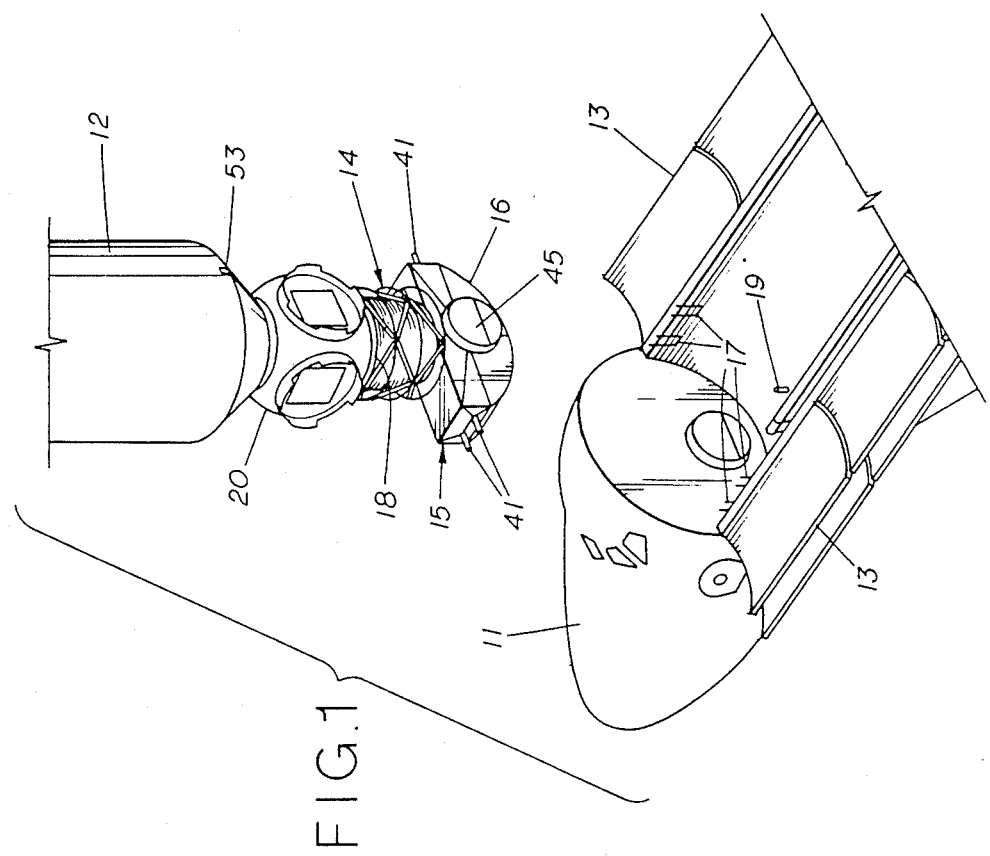

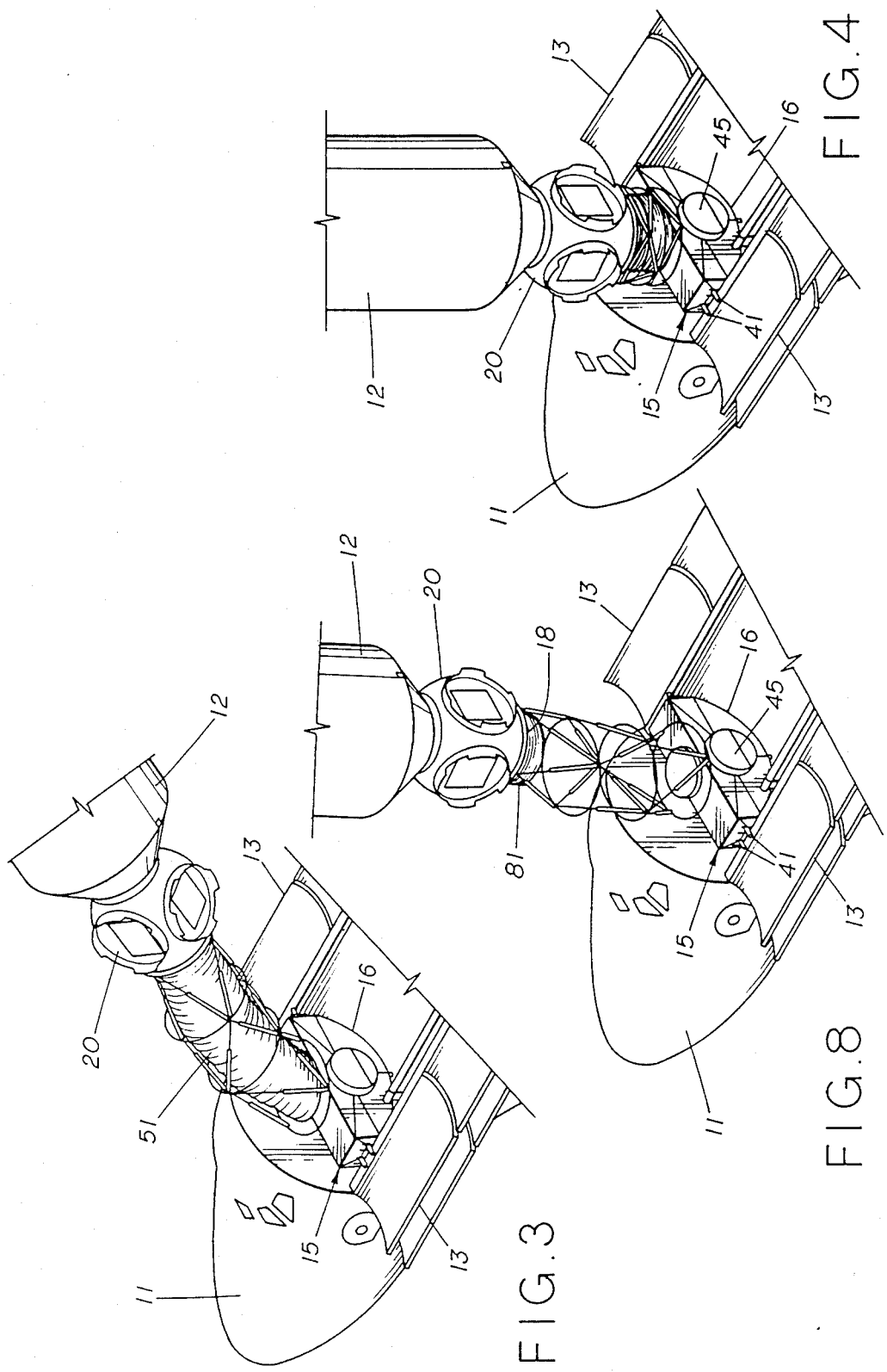

SMART TUNNEL - DOCKING MECHANISM

ORIGIN OF THE INVENTION

The invention described herein was made by employees of the U.S. Government and may be manufactured and used by or for the Government of the United States of America for governmental purposes without the payment of any royalties thereon or therefor.

RELATED APPLICATIONS

U.S. patent application, Ser. No. 292,123, filed Dec. 30, 1988 for "Docking Mechanism for Spacecraft" and U.S. patent application Ser. No. 292,121, filed Dec. 30, 1988 for "Docking System For Spacecraft" are related applications.

FIELD OF THE INVENTION

This invention relates to docking mechanisms for spacecraft, and more particularly to a mechanism for docking and undocking a space vehicle to a space station or another space vehicle which provides a tunnel connection between the spacecraft in the form of a flexible tunnel structure with motion capability in six degrees of freedom for effecting initial coupling of the spacecraft and adjustment of their relative orientation thereafter.

BACKGROUND ART

The rendezvous and docking/undocking of a space vehicle with a space station or another space vehicle requires the successful operation of many complex systems. These include systems for controlling the relative maneuvering and alignment of the spacecraft, spacecraft coupling and decoupling mechanisms, and shock attenuating and absorbing systems for reducing impact loads and for sustaining tension loads in holding the spacecraft together after initial engagement. An important consideration and frequently a requirement in the design of such systems is an accommodation for the in-flight transfer of personnel and cargo. Heretofore, docking structure designs which have been proposed to meet this requirement, provide for combined transfer tunnel and docking mechanisms in the form of rigid structures which require considerable support structure of large size and mass and relatively large high-energy shock attenuation devices. In addition, previous docking systems have usually required head-on approaches and very accurate attitude and rate control so that the docking procedures require intensive training of personnel, are very time consuming, and utilize significant amounts of propellants in space vehicle maneuver and in operation of the attitude controls system. A further problem to be encountered during a docking attempt between a space vehicle and a space station is presented by the large offset between the vehicle center of mass and the centerline of the docking mechanism which can cause a large jackknife attitude excursion of the vehicle after the docking impact. Heretofore, these problems have not been successfully addressed by the prior art devices.

A flexible tunnel structure for interconnecting a cargo module with a space vehicle is disclosed in U.S. Pat. No. 3,952,976. The tunnel structure disclosed therein is comprised of serially arranged frame members in an accordion-like tubular housing which can be elongated or shortened by means of a cable system to move in either a linear direction or along a single controlled arc.

Other space vehicle docking mechanisms are disclosed in U.S. Pat. Nos. 3,391,888; 3,608,848; 3,737,117; 3,753,536; 3,820,741; 4,219,171, and 4,682,745 which are rigid structures with associated impact shock attenuation means, and do not provide means for the in-flight transfer of cargo and personnel between the docked vehicles.

SUMMARY OF THE INVENTION

The invention is a docking mechanism for the docking of spacecraft such as a space vehicle to a space station or another space vehicle. The mechanism comprises a flexible tunnel structure in the form of a plurality of series-connected frame sections, each comprising a pair of docking ring members connected in a substantially coaxial relationship. One end section of the series is connected to the space station in sealing engagement therewith and about an egress hatch provided on the station. The other end section of the series connected frame sections is attached to a docking module equipped with trunnions adapted for connection and latching engagement with a plurality of latch mechanisms installed in the payload bay of the space vehicle. An actuator control means, which includes a plurality of actuator-attenuator devices connecting the docking ring members of each said frame section, is provided for imparting a relative motion between the ring members of each frame section in six degrees of freedom of movement. The control means is adapted to respond to sensor signals indicative of relative range and attitude of the space vehicle and space station, structural loads imposed on the tunnel structure, the latched or unlatched condition of the latching mechanisms, and the measurement of actuator strokes whereby the tunnel structure may be controlled in movement to effect latching engagement with the space vehicle and the docking of the docking module in the payload bay of the vehicle. It may also be controlled to adjust the attitude orientation of the space vehicle relative to the space station after docking which allows the station to fly in its desired attitude. Hatch means provided on the docking module are adapted for interconnection with the crew cabin of the space vehicle. In the preferred embodiment of the invention, a flexible tubular member, connected at its ends to the space station and the docking module, lines the interior of the series-connected frame sections to provide a tunnel connection between the space vehicle and space station which is suitable for the passage of personnel and cargo. The docking system can be used tn the reverse manner to separate said vehicles.

BRIEF DESCRIPTION OF THE DRAWINGS

FIG. 1 is a perspective view showing the docking mechanism of the invention attached to a space station being approached by a space shuttle orbiter in preparation for docking;

FIG. 2 is a view similar to FIG. 1 but showing the end module of a flexible tunnel structure of the invention in docked position within the payload bay of the space shuttle orbiter;

FIG. 3 is a view similar to FIG. 2 but showing the space shuttle orbiter in a pitched orientation relative to the space station;

FIG. 4 is a view similar to FIG. 3 which shows the space shuttle orbiter retracted by the mechanism of the invention in a compact rigidized connection therewith;

FIG. 8 is a perspective view of a modified form of the invention showing a space shuttle orbiter coupled thereby to a space station without the use of a flexible tunnel.

Figure 6:
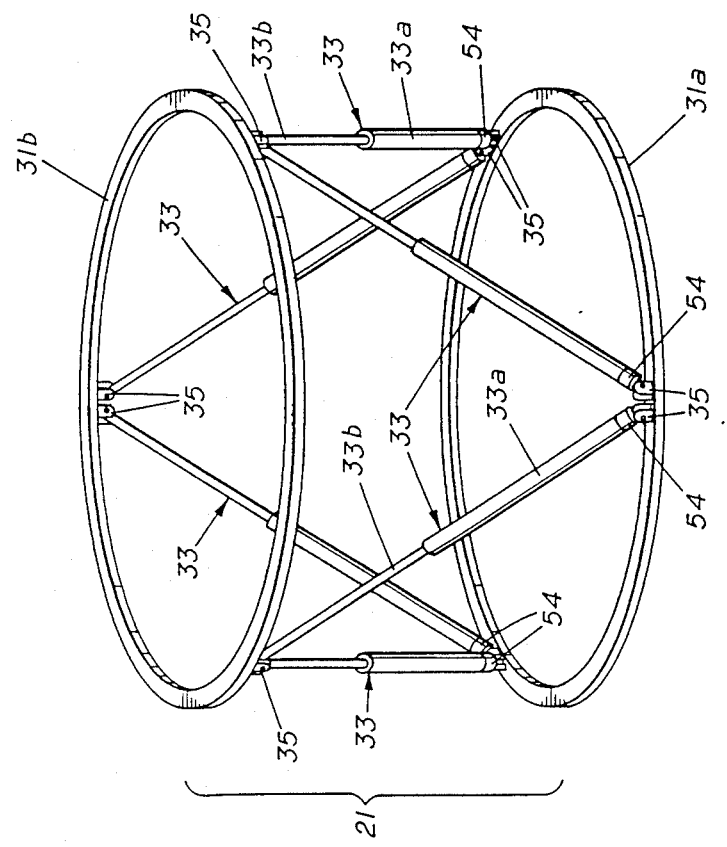
FIG. 6 is an enlarged view of a section of the tunnel structure of the invention wherein the flexible outer wall of the tunnel structure is removed to show structural details.

Referring more particularly to the drawings, there is shown in FIG. 1 a space shuttle orbiter 11 in the process of making a docking approach to a space station 12. A docking mechanism 14, representing a preferred embodiment of the invention is shown mounted on the space station 12. The space shuttle orbiter 11, only a portion of which is shown, has opened its payload bay doors 13 for receiving the end module 15 of the docking mechanism 14 and allow its connection with a plurality of latching devices 17 mounted on the walls and keel 19 of the payload bay.

The docking mechanism 14 is comprised of a plurality of tunnel frame sections 21, see FIG. 2, connected in series with the end module 15 to form an accordion-like flexible frame structure which may be elongated or shortened and controlled in six degrees of freedom of movement for purposes to be hereinafter explained.

As best shown in FIG. 6, each of the sections 21 is comprised of a pair of rings 31a, 31b of a diameter sufficient to accommodate the passage therethrough of personnel and cargo. The rings 31a, 31b are connected in a normally coaxial relation and spaced apart by a plurality of attenuator-actuator devices 33, which are at least six in number. For purposes of redundancy additional attenuator-actuator devices 33 may be provided in pairs. Each attenuator-actuator device 33 is connected by a pivot or swivel connection 35 at its ends to the rings 31a, 31b and the attachment points for the six attenuator-actuator devices 33 are arranged in three pairs, the attachment points in each pair being closely adjacent and the pairs being equiangularly spaced about the ring 31a. The attachment points to the ring 31b are similarly arranged but at locations which are intermediate the attachment locations on the ring 31a with respect to their angular relation to the central axes of the rings.

The attenuator-actuator devices 33 are each comprised of telescoping members 33a, 33b and are preferably of the conventional ball screw type which includes an actuating drive motor adapted to respond to electrical command signals for effecting a relative telescopic movement of the members 33a, 33b in a linear expansion or contraction thereof. Since each of the attenuator-actuators 33 is individually controllable, it is therefore possible to move the ring 31b with respect to the ring 31a in a direction towards or away from one another, tilted or rotated with respect to one another, thereby impart a six degrees of freedom of motion capability to a ring 31b.

Figure 5:
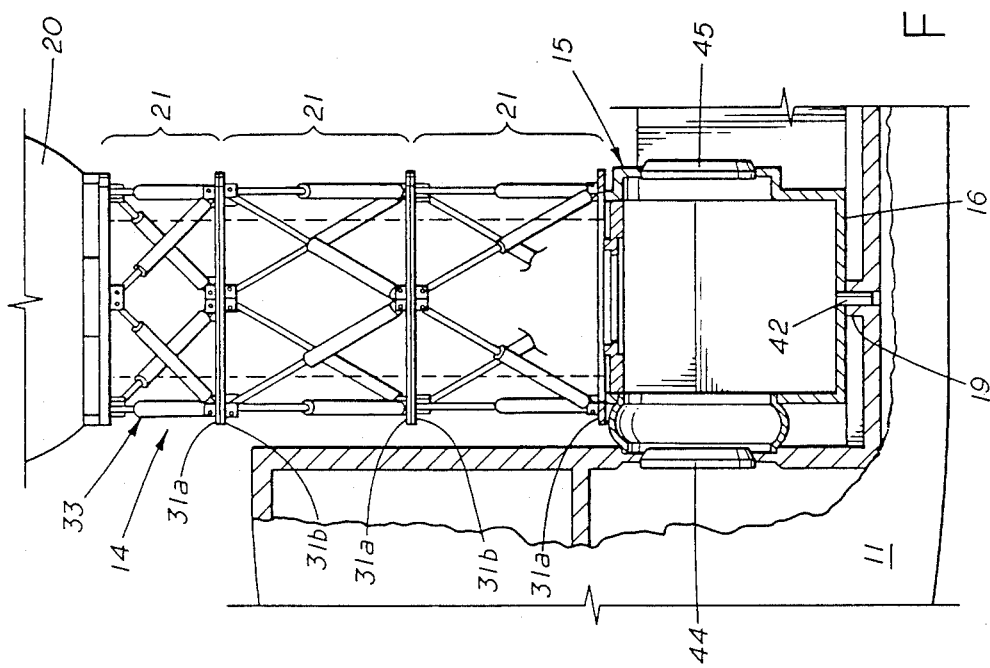
FIG. 5 is a fragmentary view, partly in section, showing details of the tunnel structure of the embodiment of the invention shown in FIG. 3 as it appears when the end module of the tunnel structure is berthed in the payload bay of the space shuttle orbiter.

In the embodiment of the invention described herein as shown in FIG. 1, one of the tunnel frame sections 21 is connected in sealing engagement about a hatch opening 18 provided in an egress module 20 of the space station 12 and preferably is a permanent attachment to the space station. The other end of the series-connected tunnel frame sections 21 is connected to the docking module 15 which is of rigid construction with an end wall 16 configured to conform to the shape of the shuttle payload bay in which it is to be inserted. The module 15 is provided with trunnions 41 at opposite sides thereof which are positioned to be received by the trunnion latches 17 mounted on the space shuttle on the walls of the payload bay and a lower keel trunnion 42 shown in FIG. 5, which is disposed to be received in a socket (not shown) mounted in the keel longeron 19 of the space shuttle. The latches 17 may be any conventional type which can be operated either manually or automatically to secure the trunnions 41 when received therein.

The end module or docking module 15 is provided with an opening which communicates with the interior of the tunnel frame sections 21 and a pair of opposed hatches 44, 45, one of which is connectable to a hatch adapter leading to the crew cabin of the space vehicle and the other of which may be opened to the payload bay of the space vehicle.

The series of tunnel frame sections 21 are lined by a flexible fabric wall 51 which may be of a construction as described in U.S. Pat. No. 3,952,976. Such a wall comprises an inner pressurizeable bladder about which is provided a laminated structural sleeve made up to include a micrometeoroid barrier and a thermal insulation blanket. The fabric wall 51 is provided with sealing connections to the space station 12 and the end module 15 and may be provided with internal structural hoop members for maintaining the internal diameter of the tunnel structure although such are not required. The end module 15 is preferably fabricated of aluminum panel members or the like, but may comprise a rigid framework lined with the same flexible fabric which lines the tunnel sections 21.

Preferably, there are at least two such tunnel frame sections 21 stacked in series to provide a range of movement for the tunnel structure which is able to accommodate the attenuation motion of large impact energies or to maneuver the tunnel structure to achieve a variety of goals including its orientation and extension movement to effect a capture of the space shuttle orbiter. It might also be used to re-orient the space shuttle orbiter with respect to the space station after docking such as shown in FIG. 3 wherein the space shuttle orbiter 11 is in pitched orientation with respect to the space station 12. Such a pitched orientation may be necessary to adjust the center of mass of the space station relative to the space shuttle orbiter in order to establish a torque equilibrium attitude wherein the torques of orbital dynamics on the docked spacecraft structures are in balance with gravity gradient torques.

With an individual tunnel frame section constructed as shown in FIG. 6, it is possible to achieve a range of rotation of sixty degrees of the top docking ring 31b with respect to the docking ring 31a. Accordingly, with three tunnel frame sections, a one hundred eighty degree rotation of one end of the tunnel frame structure with respect to the other end of the frame structure is possible.

Figure 7:
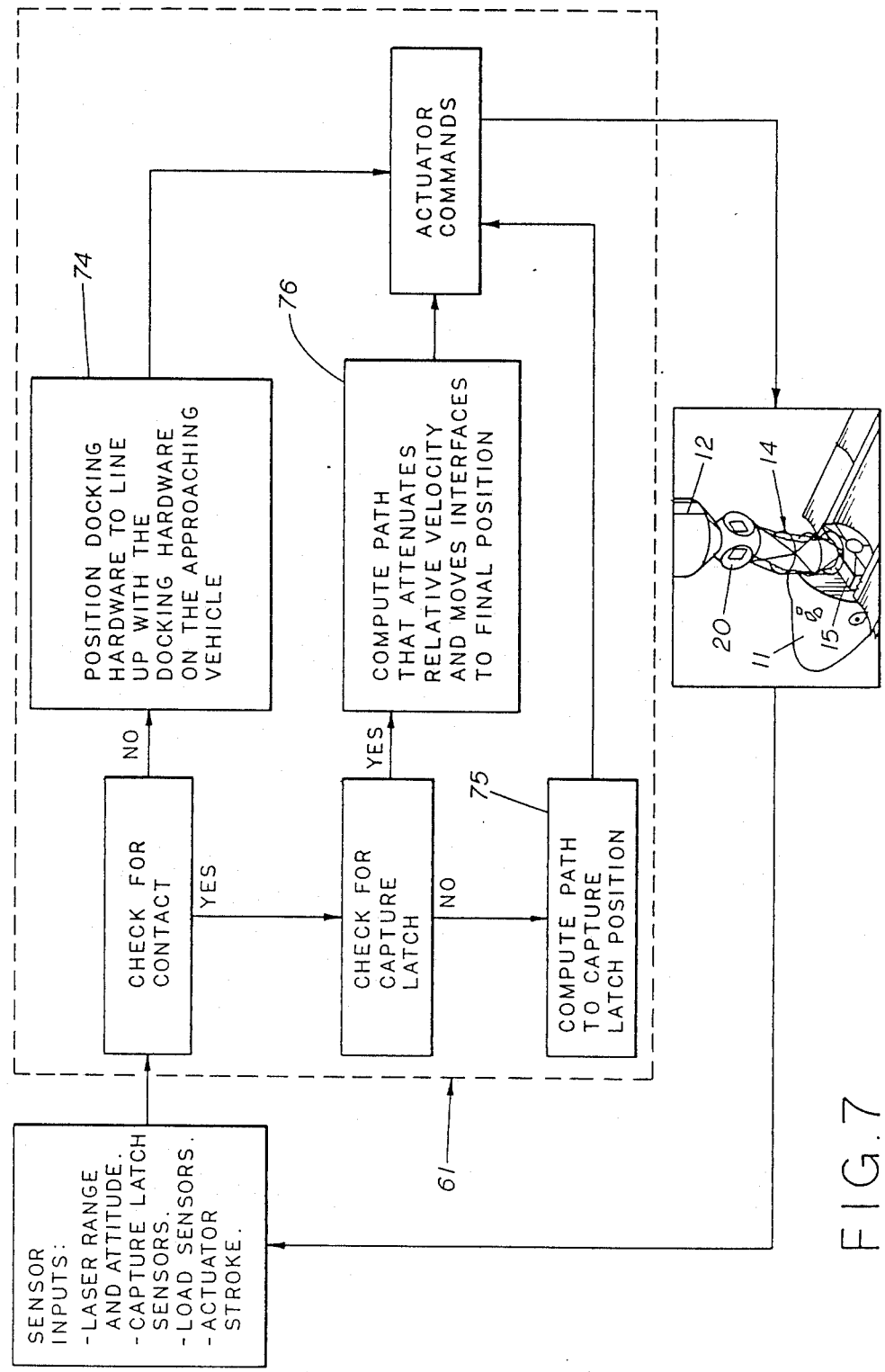
FIG. 7 is a schematic flow chart illustrating the logic control system for controlling the movement of the tunnel sections of the invention.

The control system logic for actuating and simultaneously providing individual control of each of the actuator-attenuator devices 33 is shown schematically in FIG. 7. The inputs to the system are in the form of electrical signals obtained from a plurality of sensing devices. These include a range finder 53 on the space station which provides range and attitude information, and on each of the actuator-attenuator devices 33, load sensors and actuator stroke sensors 54. In addition, capture latch sensors (not shown) are provided for indicating the capture and latch of each trunnion by the latching devices 17 in the payload bay of the space vehicle. The capture latch sensors are preferably proximity switches or limit switches which may be mounted on each of the trunnions 41, 42 or on the end module structure adjacent the trunnions.

The electrical signals, from the plurality of sensors noted above, are delivered to computer control logic circuitry 61 in the computer aboard the space station for generating command signals to each of the actuator-attenuation devices 33 and the on-board flight control system of the space station. The logic circuitry first checks to determine if there is a load sensor signal indicating contact between the space vehicle and the space station. If there is no contact, range and attitude information are used by a logic unit 74 for generating command signals to the on-board flight control system in order to correctly position and align the space station docking hardware, represented by the berthing module 15 and trunnions 41, 42 with respect to the docking hardware on the space vehicle, as represented by the trunnion latches 17 and the keel socket receptacle for the trunnion 42.

If there has been contact indicated by the load sensors, the computer logic circuitry next checks for capture latch signals indicating if the trunnions are latched in place and a capture has been effected. If no capture is indicated, a path for movement of the tunnel structure is calculated by a logic unit 75 in order to effect a capture latch position and command signals generated thereby are delivered to the on-board flight control system of the space station and the actuator-attenuators 33. However, if the capture latch sensors indicate there has been a capture, a path for movement of the tunnel frame structure by individual control of the actuator-attenuators 33 is calculated by logic unit 76 which will lessen the relative velocity of the space vehicle and space station and move the spacecraft into a preselected final position.

It is to be understood that the tunnel structure may be rigidized by computer control in any selected position, and in any degree of extension or compaction. A modified form of the tunnel structure is shown in FIG. 8 wherein the fabric liner has been eliminated. In lieu thereof, however, a rigid cylindrical stub tunnel 81 is fixed to the lower end of the egress module 12a of the space station and the frame sections 21 as shown in FIG. 6 are sleeved thereabout. Once a capture of the space shuttle orbiter is effected with the docking module docked in place in the payload bay of the space shuttle orbiter, the space station and space shuttle orbiter must be retracted towards one another to where the end of the stub tunnel 81 contacts the docking module 15 and is sealingly engaged therewith about the opening to the docking module, which is of a panel construction. A complete fluid-tight tunnel connection is therefore established.

It should therefore be appreciated that a unique spacecraft docking mechanism is disclosed herein which makes possible the attenuation of docking impact of relatively large and massive spacecraft without the requirement for relatively heavy and massive support mechanisms. While it would be possible to mount the tunnel structure on the space shuttle orbiter, it is preferred that this structure be mounted as a permanent fixture on the space station so that little cargo space is therefore taken up by the cooperative coupling mechanisms in the form of trunnion latches which are provided on the space shuttle orbiter.

It is also to be understood that the foregoing description of a preferred embodiment of the invention has been presented for purposes of illustration and explanation and is not intended to limit the invention to the precise form disclosed. For example, the number of tunnel frame sections 21 may be increased to expand the range of movement and flexibility of the tunnel structure. In cross section, the tunnel structure and docking rings may be other than circular and the shape of the docking module of the tunnel may be adjusted to accommodate connection with different space vehicles. While the actuator-attenuator devices 33 have been described as ball-screw actuators, it is also feasible to use hydraulic actuators which can be controlled by electrical command signs from the automatic control system. It is to be appreciated therefore, that various material and structural changes, many of which are suggested herein, may be made by those skilled in the art without departing from the spirit of the invention.

We claim:

1. A docking mechanism for the docking and undocking of a space vehicle with a space station or another space vehicle, said docking mechanism comprising:

a deployable extensible tunnel structure mounted on said space station, said tunnel structure comprising a plurality of interconnected serially arranged frame sections with an end frame section of said series of frame sections being connected about an egress hatch of the space station, each said frame section including a pair of docking ring members interconnected in a normally coaxial spaced apart relationship defining an unobstructed central opening through said frame section;

actuator control means connected to said docking ring members for imparting a relative motion between said docking ring members of each said frame section in six degrees of freedom of movement;

a docking module attached to the other end section of said series of connected frame sections and provided with an opening communicating with the central opening of the adjacent frame section to which it is attached;

a plurality of latch mechanisms mounted on the space vehicle;

a plurality of trunnion members affixed to said docking module and adapted for interconnection with said latch mechanisms whereby said trunnion members are latchable thereto for coupling the space vehicle to the space station;

a pressurizeable tubular member disposed to extend through the central openings defined by said series of interconnected frame sections and of a cross section diameter suitable for the passage of personnel and cargo therethrough, said tubular member being attached at one end about said egress hatch in sealing relationship with the space station;

hatch means provided on said docking module adapted for interconnection in sealing relationship with the space vehicle for establishing communication therebetween when said docking module trunnions are latched to said space vehicle; and means interconnecting said tubular member with said docking module in sealing relationship therewith about said opening of the docking module when the docking module trunnions are latched to the space vehicle, said tunnel structure being controllable in movement with respect to its end attachment to the space station by the control by said actuator means of the individual frame sections in six degrees of freedom of movement.

2. A docking mechanism as set forth in claim 1 wherein said pressurizeable tubular member is a flexible fluid-impervious fabric connected at its ends in sealing relationship with the space station and the docking module, respectively.

3. A docking mechanism as set forth in claim 1 wherein said actuator means is automatically responsive to the latched condition of said latching mechanisms and the loads imposed on said tunnel structure on docking impact of the space station and spare vehicle for controlling the motion of said tunnel structure.

4. A docking mechanism as set forth in claim 1 wherein said actuator means comprises:

a plurality of actuator-attenuator devices connecting the docking ring members of each said frame section, each said device being in the form of a pair of linearly adjustable telescopic members and pivotally connected at its ends to the respective ring members of a frame section;

a plurality of sensor means for sensing and signalling the latched or unlatched condition of said latching means, the range and attitude orientation of the space station with respect to the space vehicle, loads imposed on said tunnel structure and the length of strokes of the telescopic devices; and computer logic circuitry responsive to said sensor signals for generating command signals for controlling the actuator-attenuator devices to effect the deployment and maneuvering of the tunnel structure.

5. A docking mechanism as set forth in claim 1 wherein said actuator control means comprises at least six telescopic actuator-attenuator devices for each said frame section, each said device being comprised of linearly adjustable telescopic members and pivotally connected at its ends to the respective ring members of the frame section wherein the attachment points for the devices on a first ring member of a frame section are arranged in pairs and the points in each pair are relatively closely adjacent to one another with the midpoints between the pairs being equiangularly spaced about the ring member and the attachment points on the other ring member are similarly arranged in pairs at locations with respect to their angular relation to the central axes of the ring members which are intermediate the pairs of attachment points on said first ring member and each actuator-attenuator device which connects at the same pair of attachment points on said first ring member being connected to the other ring member of the frame section at attachment points located in different pairs on said other ring member.

6. A docking mechanism for the coupling and docking of a space vehicle with a space station, said docking mechanism comprising:

a deployable extensible tunnel structure mounted on said space station, said tunnel structure comprising a plurality of interconnected serially arranged frame sections with an end frame section of said series of frame sections being connected about an egress hatch of the space station, each said frame section including a pair of docking ring members interconnected in a normally coaxial spaced apart relationship defining an unobstructed central opening through said frame section of a size sufficient to accommodate the passage of personnel and cargo therethrough;

actuator means connected to said docking ring members for imparting a relative motion between said docking ring members of each said frame section in six degrees of freedom of movement;

a docking module attached to the other end section of said series of connected frame sections and provided with an opening communicating with the central opening of the adjacent frame section to which it is attached;

a fluid impervious flexible tubular member of a diameter corresponding substantially to that of said ring members and disposed to extend through the central openings defined by said series of interconnected frame sections, said tubular member being attached at its ends in sealing relationship with said space station and said docking module about the egress hatch of the space station and said opening of said docking module, respectively;

a plurality of latch mechanisms mounted on the space vehicle;

a plurality of trunnion members affixed to said docking module and adapted for interconnection with said latch mechanisms whereby said trunnion members are latchable thereto; and hatch means provided on said docking module for interconnection in sealing relationship with the space vehicle for establishing communication therebetween when said docking module trunnions are latched to said space vehicle, said tunnel structure being controllable in movement through control by said actuator means of said individual frame sections in six degrees of freedom of movement to thereby effect a coupling with the space vehicle when in proximity thereto and the subsequent adjustment of the attitude orientation of the space vehicle relative to the space station after coupling.

7. A docking mechanism as set forth in claim 6 wherein said actuator means includes a plurality of linear actuator-attenuator devices interconnecting the spaced ring members of each said frame section and wherein each said actuator-attenuator device is responsive to electrical command signals for controlling the relative movement of one ring member to the other.

8. A docking mechanism as set forth in claim 6 wherein said actuator means includes logic circuit means responsive to a latched condition of said latching mechanisms and structural loads imposed on said tunnel structure by the coupling of the space station and the space vehicle for simultaneously controlling the movement of each of said frame sections and thereby controlling the movement of said tunnel structure to attenuate the docking impact nd for adjusting the attitude orientation of the space vehicle with respect to the space station subsequent to coupling.

* * * * *